United States Patent
Entezari et al.

(10) Patent No.: US 10,348,831 B2
(45) Date of Patent: Jul. 9, 2019

(54) METHOD AND SYSTEM FOR CONTAINERIZED INTERNET OF THINGS (IOT) DEVICES

(71) Applicants: Mehdi Entezari, Malvern, PA (US); Alexander Paul Curtin, Malvern, PA (US); Daniel M McGinnis, Malvern, PA (US)

(72) Inventors: Mehdi Entezari, Malvern, PA (US); Alexander Paul Curtin, Malvern, PA (US); Daniel M McGinnis, Malvern, PA (US)

(73) Assignee: UNISYS CORPORATION, Blue Bell, PA (US)

( * ) Notice: Subject to any disclaimer, the term of this patent is extended or adjusted under 35 U.S.C. 154(b) by 148 days.

(21) Appl. No.: 15/139,873

(22) Filed: Apr. 27, 2016

(65) Prior Publication Data

US 2017/0315820 A1    Nov. 2, 2017

(51) Int. Cl.
    *G06F 9/50*     (2006.01)
    *H04L 29/08*     (2006.01)

(52) U.S. Cl.
    CPC ............... *H04L 67/12* (2013.01); *G06F 9/50* (2013.01); *H04L 67/10* (2013.01); *H04L 67/125* (2013.01)

(58) Field of Classification Search
    CPC ....... G06F 9/445; G06F 9/45533; H04L 67/12
    See application file for complete search history.

(56) References Cited

U.S. PATENT DOCUMENTS

| | | | |
|---|---|---|---|
| 2014/0229620 A1* | 8/2014 | Horman | H04L 47/783 709/226 |
| 2016/0180100 A1* | 6/2016 | Britt | H04W 4/008 726/27 |
| 2017/0046409 A1* | 2/2017 | Bender | G06F 17/30563 |
| 2017/0126578 A1* | 5/2017 | Amulothu | H04L 47/70 |

* cited by examiner

*Primary Examiner* — Sisley N Kim

(57) ABSTRACT

A method and system for containerized Internet of Things (IoT) devices. The method includes receiving by a computing platform IoT device sensor data. The method also includes receiving by the computing platform at least one container image script. The method also includes loading into the computing platform at least one container, which is based on the at least one container image script received by the computing platform. The method also includes processing at least a portion of the IoT device sensor data within the at least one container to generate processed IoT device data. The method also includes transmitting from the computing platform at least a portion of the processed IoT device data. The method also includes removing the at least one container from the computing platform in response to at least a portion of the processed IoT device data being transmitted from the computing platform.

17 Claims, 4 Drawing Sheets

METHOD AND SYSTEM FOR CONTAINERIZED INTERNET OF THINGS (IOT) DEVICES

BACKGROUND

Field

The instant disclosure relates to Internet of Things (IoT) devices, and in particular to methods and systems for containerized IoT devices.

Description of the Related Art

The Internet is a global system of interconnected computers and computer networks that use a standard Internet protocol suite (e.g., the Transmission Control Protocol (TCP) and Internet Protocol (IP)) to communicate with each other. The Internet of Things (IoT) is the network of physical objects, devices, vehicles, buildings and other items that are embedded with electronics, software, sensors, and network connectivity, which enables these objects to collect and exchange data.

IoT devices typically include a wide variety of devices, typically equipped with one or more sensors, that collect data using various technologies, process the data as necessary, and share the data with other devices. IoT devices are used in a wide variety of applications, such as environmental monitoring, infrastructure management, manufacturing, energy management, telecommunications, medical and healthcare systems, building and home automation, and transportation.

With the increased use of IoT device applications, IoT devices are becoming more complex and powerful in terms of data collection, processing and functionality. Accordingly, IoT devices are becoming equipped with increased data collection capacity and processing power. As the need for increased IoT device data collection and processing power accelerates, IoT devices are becoming more complex and powerful to keep up with the increasing IoT application demands.

SUMMARY

Disclosed is a method and system for containerized Internet of Things (IoT) devices. The method includes receiving by a computing platform IoT device sensor data. The method also includes receiving by the computing platform at least one container image script. The method also includes loading into the computing platform at least one container, which is based on the at least one container image script received by the computing platform. The method also includes processing at least a portion of the IoT device sensor data within the at least one container to generate processed IoT device data. The method also includes transmitting from the computing platform at least a portion of the processed IoT device data. The method also includes removing at least one container from the computing platform in response to at least a portion of the processed IoT device data being transmitted from the computing platform.

DETAILED DESCRIPTION

Figure 1:
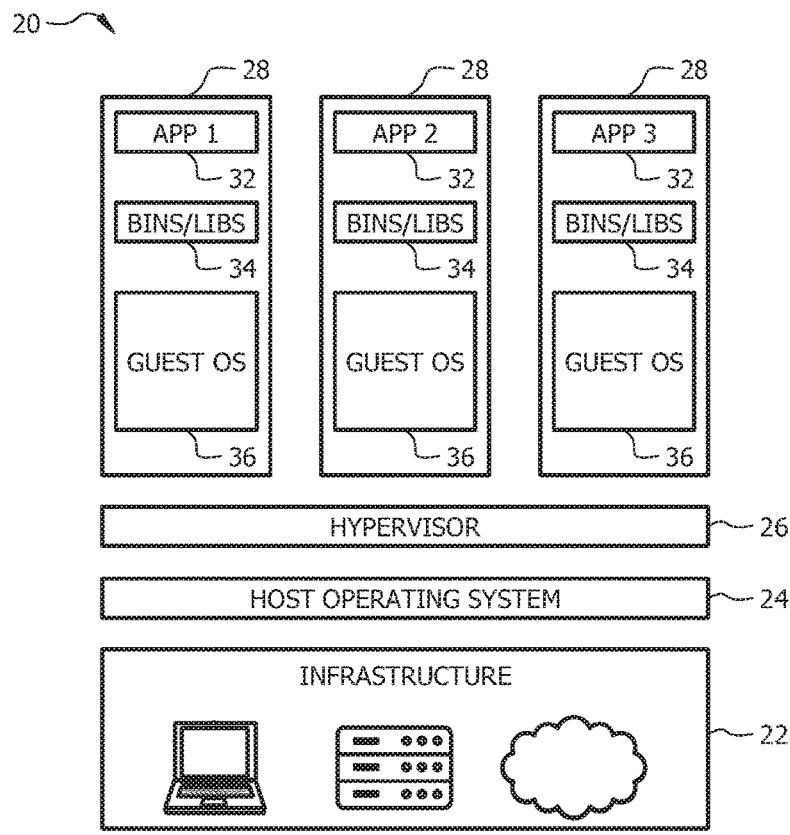
FIG. 1 is a schematic view of a conventional virtual machine architecture.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Applications, including software components, can run on a number of different computing platforms. For example, an application can run in a container on a physical or virtual machine. In the case of an application running in a container on a virtual machine, the virtual machine provides hardware virtualization, and the container provides operating system virtualization.

A container is a component, often a software component, that hosts other components, typically other software components. A container typically is implemented as an isolated user space instance, which may look and feel like a real server. A container sometimes is referred to as a virtualization engine (VE), a virtual private server (VPS) or a jail. A container provides execution support to the software components that the container hosts in a manner that is similar to an operating system hosting processes. In general, containers allow applications to run more reliably when the applications are moved from one computing environment to another. Also, a container can serve as a protective barrier, e.g., by monitoring the interactions between hosted components and software components outside of the container, and restricting the interactions to those that are deemed safe.

A container is deployed on a machine, such as a physical machine in a data center, or on a virtual machine in a private or public cloud computing environment or platform. The container emulates an operating system environment, e.g., by having its own file system and namespace. Thus, the container can run as a process in an operating system environment of a virtual machine while providing another operating system environment inside the container.

Figure 2:
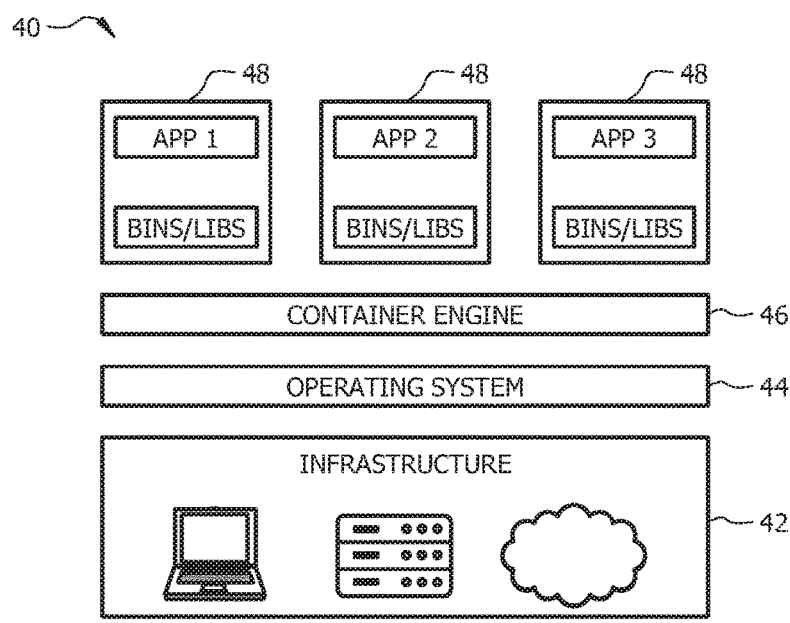
FIG. 2 is a schematic view of a conventional container architecture.

FIG. 1 is a schematic view of a conventional virtual machine architecture 20. For purposes of comparison, FIG. 2 is a schematic view of a conventional container architecture 40.

The virtual machine architecture 20 typically includes a suitable host infrastructure or computing platform 22 having a host operating system 24 installed thereon. The virtual machine architecture 20 also includes a hypervisor 26, or virtual machine manager (VMM), which allows multiple virtual machines 28 to share a single hardware host. Each virtual machine 28 includes an application 32, the necessary binaries and libraries 34, and an entire guest operating system 36. Also, each operating system 36 appears to have the host's processor, memory, and other resources all to itself. Thus, in virtual machine architecture 20 as shown, a computing platform 22 running three virtual machines 28 would have the hypervisor 26 and three separate guest operating systems 36 running on top of it.

The container architecture 40 (FIG. 2) typically includes a suitable host infrastructure or computing platform 42 having an operating system 44 installed thereon. A container engine 46 supports one or more containers 48 and all of the container's respective dependencies (e.g., an application, and the necessary binaries and libraries). The container engine 46 runs as an isolated process in a user space on the host operating system 44. Therefore, in the container architecture 40 as shown, there are three containerized applications running on the operating system 44. Also, in general, a container is not tied to any specific infrastructure. Therefore, a container can run on any computer, and on any infrastructure, such as a cloud computing platform.

In contrast to the virtual machine architecture 20, in the container architecture 40, the computing platform 42 running three containerized applications 48 runs a single operating system 44, which is shared among the three containerized applications 48, and which can be shared with other containers (not shown). Shared parts of the operating system are read only, while each container has its own mount (i.e., a way to access the container) for writing. Therefore, the container 48 is much more lightweight, and uses far fewer resources than virtual machines.

According to an embodiment, container technology is used with one or more IoT devices to provide IoT device processing functionalities without the need for relatively complex or powerful processing units within each IoT device. According to an embodiment, the IoT device runs minimal software for the purposes of collecting data and presenting information. The bulk of the processing and the long term storage of the data collected by the IoT device is performed by one or more applications in one or more containers executing in a suitable computing platform, such as in a cloud-based computing platform.

According to an embodiment, data collected from the IoT device sensors and container image script information are transferred from the IoT device to a suitable container-as-a-service provider executing in a suitable computing platform, such as in a cloud-based computing platform. Based on the container image script, an appropriate container image is retrieved from a repository by the container engine/provider within the cloud-based computing platform. Because containers are self-contained and can be spawned and made operational in a few hundred milliseconds, there is no need for continuously running an application within its associated container or virtual machine within the cloud-based computing platform. The provider of the cloud-based computing platform maintains each container as a self-contained entity. The container switches to a processing mode while the container is running on the container-as-a-service, and the container pulls any additional image (i.e., application code) that is needed from an appropriate repository to process the data. The container runs the container image, processes the collected data from the IoT device, and then delivers the output (processed IoT device data) back to the IoT device.

Figure 3:
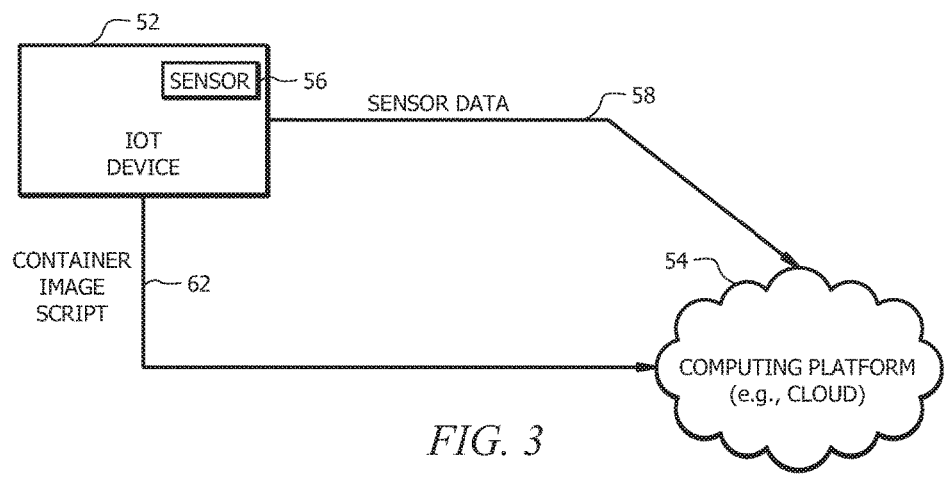
FIG. 3 is a schematic view of a system for containerized Internet of Things (IoT) devices, according to an embodiment, showing the initial transmission of data and information from an IoT device to a computing platform.

FIG. 3 is a schematic view of a system 50 for containerized Internet of Things (IoT) devices according to an embodiment, showing the initial transmission of data and container information from an IoT device 52 to a computing platform 54. The IoT device 52 can be any suitable IoT device, e.g., one or more IoT devices described previously herein. The computing platform 54 can be any suitable computing platform, e.g., a public or private cloud-based computing platform. The computing platform 54 includes the necessary processing units to process IoT device sensor data, as will be discussed in greater detail hereinbelow.

The IoT device 52 includes one or more sensors 56, which collect data using various technologies. The data collected by the one or more sensors 56 can be referred to as IoT device sensor data 58. As discussed hereinabove, conventionally, an IoT device collects data via its sensors, processes the collected data within the IoT device itself, and then sends out the processed data, e.g., to other IoT devices or to a networked infrastructure. According to an embodiment, the IoT device 52 runs minimal software, i.e., for the purpose of collecting data and presenting information.

The IoT device 52 is coupled to the computing platform 54 via any suitable network connection, e.g., wirelessly using an appropriate wireless data transmission protocol. The IoT device 52 includes appropriate output components and network connection hardware (not shown) to transmit or otherwise transfer IoT device sensor data 58 to the computing platform 54. According to an embodiment, the IoT device 52 also transmits to the computing platform 54 one or more container image scripts 62. As will be discussed in greater detail hereinbelow, the container image script 62 is a script, i.e., a list of executable commands, that describes a container image or container code that is to be retrieved, e.g., from a repository, and loaded into the computing platform 54 for one or more containers to be started within the computing platform 54.

Figure 4:
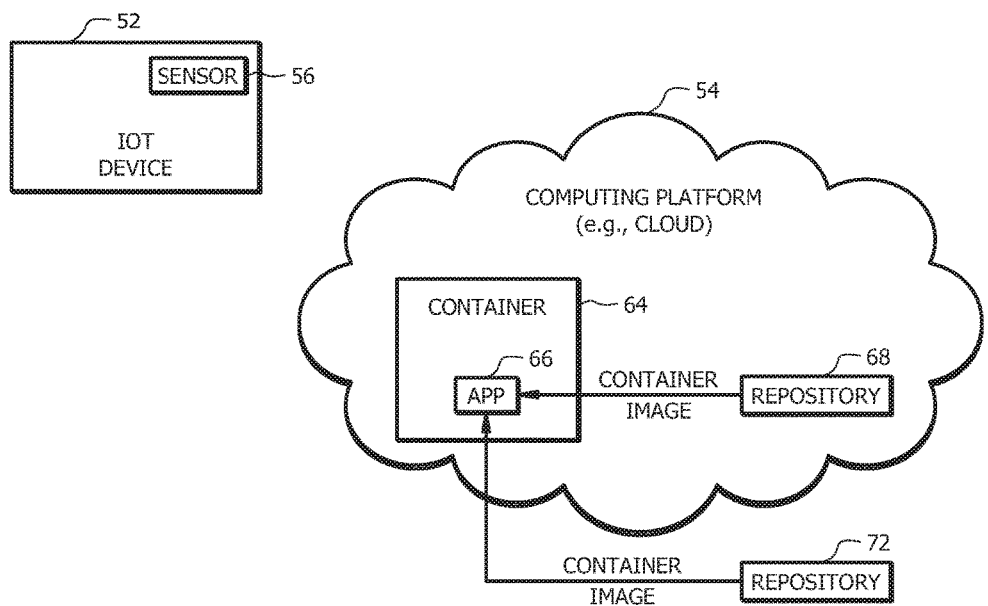
FIG. 4 is a schematic view of the system for containerized IoT devices of FIG. 2, according to an embodiment, showing a container loaded within the computing platform and the processing of IoT device sensor data within the computing platform.

FIG. 4 is a schematic view of the system 50 for containerized IoT devices of FIG. 2, according to an embodiment, showing a container 64 loaded within the computing platform 54, and the processing of IoT device sensor data 58 within the computing platform 54. Once the computing platform 54 has received IoT device sensor data 58 and the container image script 62, one or more containers 64 are loaded into the computing platform 54, based on the received container image script 62. The container image script 62 contains a pointer to a particular container image or container code that is to be retrieved from one or more repositories, e.g., a repository 68 located within the computing platform 54 or a repository 72 external to and connected with the computing platform 54.

The container image retrieved from the repository includes information about the container or containers 64 to be loaded into the computing platform 54. The retrieved container image also includes one or more applications 66 or paths to applications that are to be executed within the container 64 to process the IoT device sensor data 58. The retrieved container image and/or the application itself also can include other information, such as the state of the container being retrieved, pointers to records in one or more databases or other locations that may contain relevant information needed to process the IoT device sensor data 58, and possibly any environmental parameters needed for operation and maintenance of the containers 66 within the computing environment and/or the applications 66 within the containers 64.

Once the container 64 has been loaded into the computing platform 54, one or more suitable applications 66 are executed within the container 64 to process the IoT device sensor data 58. The computing platform 54 runs each container 64 as a self-contained entity. As discussed hereinabove, because each container 64 is self-contained, there is no need for continuously running an application 66 within its respective container 64. Within the container 64, each application 66 is run only as needed to process the IoT device sensor data 58. This compares favorably with conventional approaches, in which applications need to run continuously within a computing platform or on a device itself. According to an embodiment, the select, non-continuous running of an application 66 within the container 64 is determined by the container image script 62, the retrieved container image, and the nature of the IoT device sensor data 58.

When IoT device sensor data 58 is received from the IoT device 52 and needs to be processed, the computing platform 54 refers to the container image script 62, which embodies the repository that maintains the container image. Based on the container image script 62 and the container image, the computing platform 54 loads the container 64, the associated applications 66, and any other information/data needed for processing the IoT device sensor data 58. The container 64 runs the application 66, and processes the IoT device sensor data 58 as needed to generate processed IoT device data.

Figure 5:
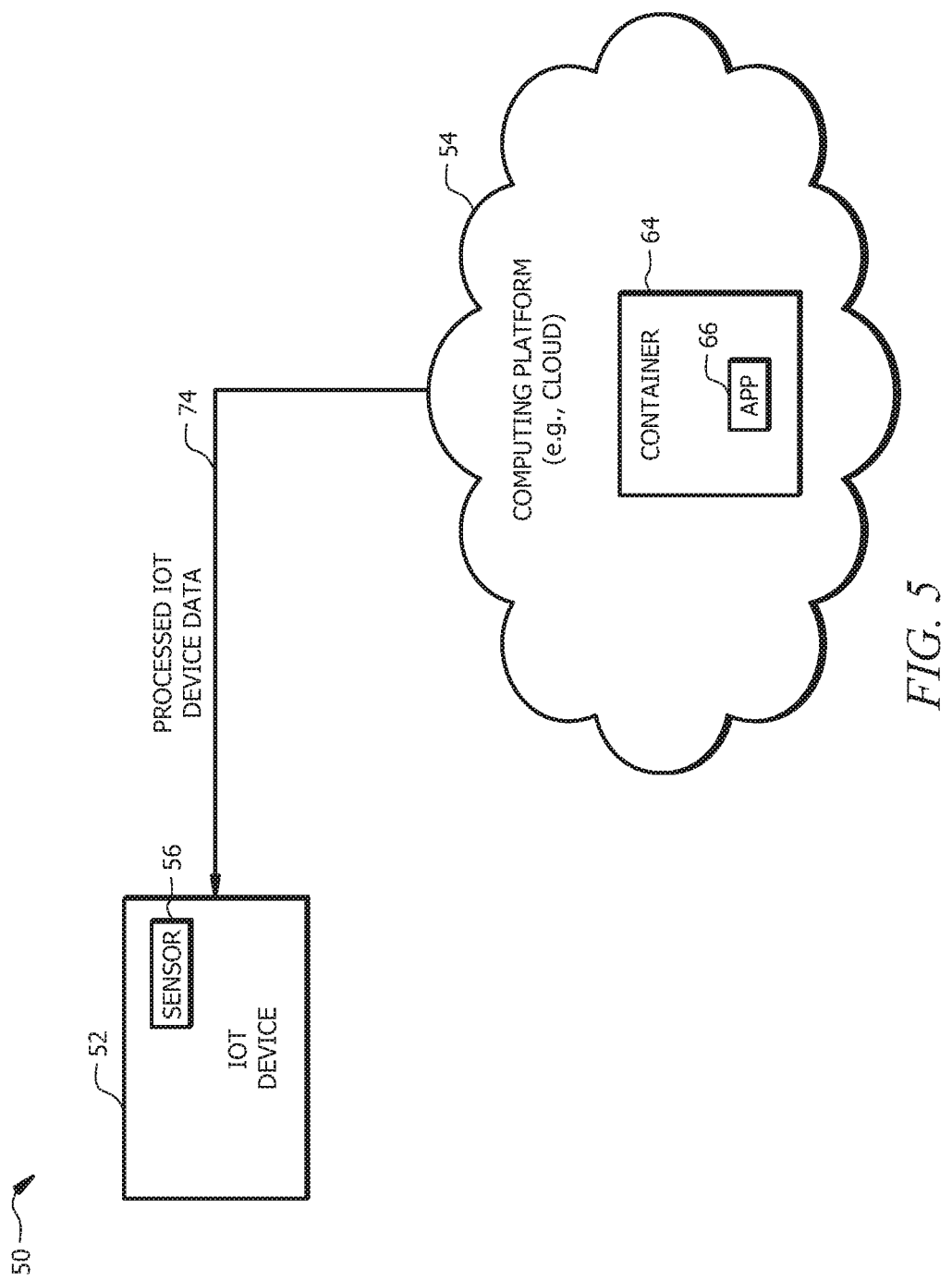
FIG. 5 is a schematic view of the system for containerized IoT devices of FIG. 2, according to an embodiment, showing the transmission of processed IoT device data from the computing platform to the IoT device.

FIG. 5 is a schematic view of the system 50 for containerized IoT devices of FIG. 2, according to an embodiment, showing the transmission of processed IoT device data from the computing platform 54 to the IoT device 52. Once the container 64 runs the appropriate application(s) 66 to process the IoT device sensor data 58, the container 64 and/or the computing platform 54 transmits or otherwise delivers the resulting processed IoT device data 74 to the IoT device 52.

Once the container 64 and/or the computing platform 54 has delivered the processed IoT device data 74 to the IoT device 52, the container 64 (and its associated application 66) is stopped and removed from the computing platform 54. The container 64 will get reloaded from the repository, based on the information in a new container image script 62 that accompanies new IoT sensor data information 58 transferred from the IoT device 52 to the computing platform 54. If the actual container 64 is modified as a part of the processing, then the difference between the base container image and modified container image is pushed to the container image repository.

According to an embodiment, the system for containerized IoT devices provides several advantages compared to conventional IoT device processing arrangements. For example, according to an embodiment, because the application code resides in the container within the computing platform, the application run time code can be modified, upgraded or otherwise improved without a need to update the IoT device. In conventional arrangements, each IoT device must be modified or updated to modify or update the application used to process the IoT device sensor data.

Also, according to an embodiment, because the IoT device sensor data is maintained and processed in a container within the computing platform, the IoT device is more secure because no IoT device sensor data is maintained in the IoT device. Also, the IoT device does not require a relatively large amount of processing power or storage capacity, thus helping to reduce to reduce cost and preventing the possibility of running relatively sophisticated malware programs. Furthermore, for even more security, any data generated by the IoT device can be encrypted in such a manner that only the application(s) running in the container within the computing platform can decrypt such information. In such case, the decryption key or keys can be provided to the container application(s) by the IoT device, or provided in some other suitable manner.

Also, according to an embodiment, because the processing of IoT device sensor data is performed in the container within the computing platform, the IoT device does not have maintain a continuous network connection with the computing platform once the IoT device sensor data has been transferred to the computing platform, Therefore, once the IoT device transfers the IoT device sensor data to the computing platform, the IoT device can be deployed to remote locations, e.g., to begin collecting additional sensor data.

Also, according to an embodiment, based on the container image script information being transferred from the IoT device to the computing platform, the behavior of the IoT device can be changed based on the results of the processed IoT device data. Also, because the container image is pulled from a repository, the container image can be modified without having to modify the IoT device. In such case, the IoT device sends its sensor data, along with the container image script that contains the pointer to the repository, and the modified container image is pulled down from the repository.

As an example, the transfer of IoT device data from an IoT device to a computing platform, such as a cloud computing environment, begins by the IoT device sending off a request for a container to be uploaded to the computing platform. The container provider responds with the IP address of new container instance. The container then starts listening for traffic on a predetermined port. The IoT device sends IoT device data as an http PUT request over the specified port. The container receives the IoT device data and processes the data. Also, as an added security layer, a suitable public key, such as an RSA (Rivest-Shamir-Adleman) public key, can be sent over as an argument to the container provider so that the data could be encrypted with a private key by the IoT device. However, if sending the data over with the request is not allowed, a similar quick handshake could be used to send the data over after the container has been uploaded to the computing platform.

Figure 6:
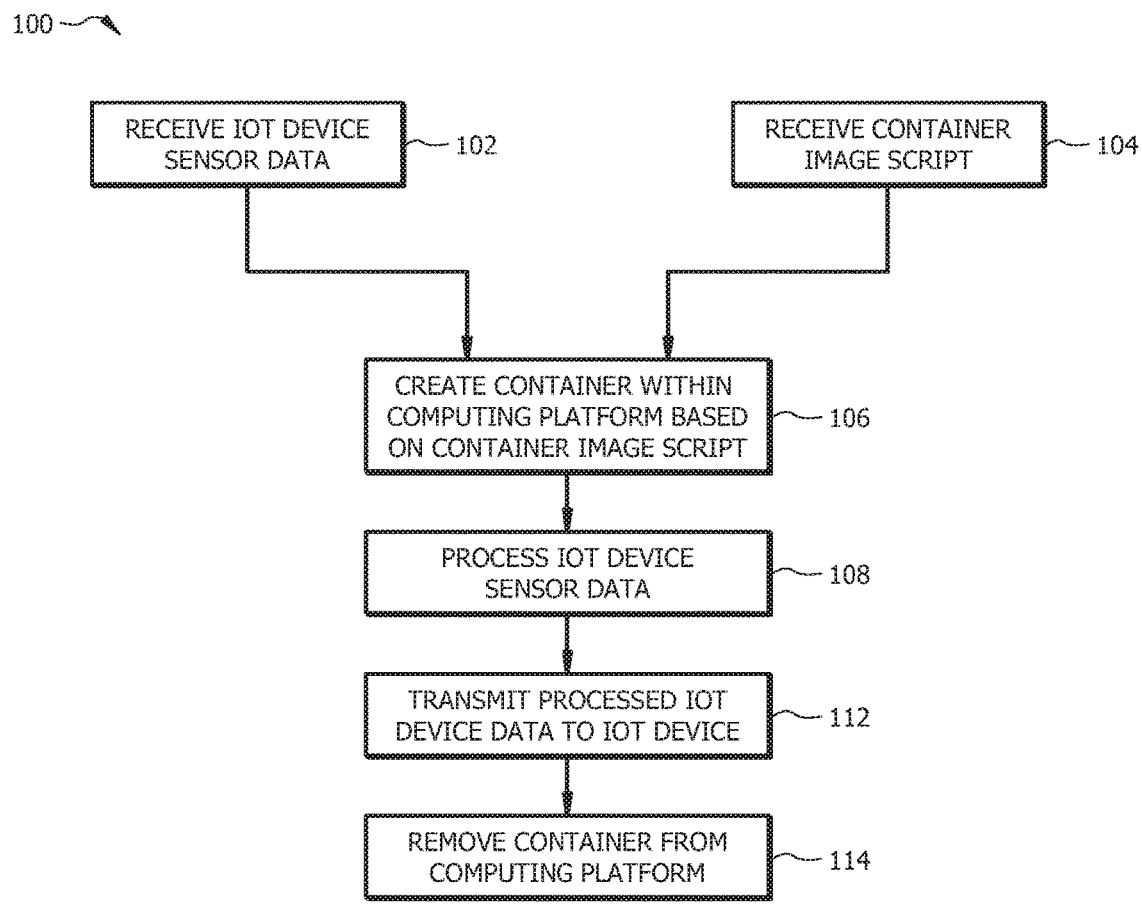
FIG. 6 is a flow diagram of a method for containerized IoT devices, according to an embodiment.

FIG. 6 is a flow diagram of a method 100 for containerized IoT devices, according to an embodiment. The method 100 includes a step 102 of receiving IoT device sensor data. As discussed hereinabove, the IoT device includes one or more sensors that collect IoT device sensor data, and the IoT device sends the IoT device sensor data to the computing platform, e.g., in a suitable manner.

The method 100 also includes a step 104 of receiving at least one container image script. As discussed hereinabove, the IoT device transmits to the computing platform at least one container image script.

The method 100 also includes a step 106 of creating a container within the computing platform, based on the at least one container image script. As discussed hereinabove, once the computing platform has received IoT device sensor data and the at least one container image script, the computing platform creates or generates one or more containers within the computing platform, based on the at least one container image script.

The method 100 also includes a step 108 of processing IoT device sensor data. As discussed hereinabove, once the container has been created within the computing platform, one or more suitable applications within the container can be executed to process the IoT device sensor data.

The method 100 also includes a step 112 of transmitting the processed IoT device data to the IoT device. As discussed hereinabove, once the container runs the appropriate application(s) to process the IoT device sensor data, the container transmits or otherwise delivers the resulting processed IoT device data to the IoT device.

The method 100 also includes a step 114 of removing the container from the computing platform. As discussed hereinabove, once the container has delivered the processed IoT device data to the IoT device, the container is removed from the computing platform.

It will be apparent to those skilled in the art that many changes and substitutions can be made to the embodiments described herein without departing from the spirit and scope of the disclosure as defined by the appended claims and their full scope of equivalents.

The invention claimed is:

1. A method for processing Internet of Things (IoT) device sensor data, comprising:
   receiving by a computing platform IoT device sensor data;
   receiving by the computing platform at least one container image script, wherein the at least one container image script includes a pointer to a record relevant to process the IoT device sensor data, the at least one container image script includes parameters needed for operation of at least one container;
   loading into the computing platform the at least one container, based on the at least one container image script received by the computing platform;
   processing at least a portion of the IoT device sensor data within the at least one container to generate processed IoT device data;
   transmitting from the computing platform at least a portion of the processed IoT device data; and
   removing the at least one container from the computing platform in response to at least a portion of the processed IoT device data being transmitted from the computing platform.

2. The method as recited in claim 1, wherein the at least one container image script includes a pointer to a first container image stored in a repository, and wherein loading the at least one container into the computing platform comprises retrieving the first container image from the repository.

3. The method as recited in claim 2, wherein the first container image includes at least one application or at least one path to an application, and wherein processing at least a portion of the IoT device sensor data within the at least one container further comprises executing the at least one application within the at least one container to process at least a portion of the IoT device sensor data.

4. The method as recited in claim 1, wherein processing at least a portion of the IoT device sensor data within the at least one container further comprises running at least one application within the at least one container to process at least a portion of the IoT device sensor data.

5. The method as recited in claim 4, wherein the IoT device sensor data is encrypted data that can only be decrypted by the application running within the at least one container.

6. The method as recited in claim 1, wherein the IoT device sensor data received by the computing platform is transmitted from at least one IoT device via a network connection between the IoT device and the computing platform.

7. The method as recited in claim 1, wherein the computing platform is cloud-based computing platform.

8. A method for processing Internet of Things (IoT) device sensor data, comprising:
   collecting by an IoT device IoT device sensor data;
   receiving by a computing platform IoT device sensor data from the IoT device, wherein the at least one container image script includes a pointer to a record relevant to process the IoT device sensor data, the at least one container image script includes parameters needed for operation of at least one container;
   receiving by the computing platform the at least one container image script from the IoT device;
   loading into the computing platform at least one container, based on the at least one container image script received by the computing platform;
   processing by the at least one container at least a portion of the IoT device sensor data to generate processed IoT device data;
   transmitting by the computing platform at least a portion of the processed IoT device data from the at least one container to the IoT device; and
   removing the at least one container from the computing platform in response to the computing platform transmitting at least a portion of the processed IoT device data from the at least one container to the IoT device.

9. The method as recited in claim 8, wherein the at least one container image script includes a pointer to a first container image stored in a repository, and wherein loading the at least one container into the computing platform comprises retrieving the first container image from the repository.

10. The method as recited in claim 9, wherein the first container image includes at least one application or at least one path to an application, and wherein processing at least a portion of the IoT device sensor data within the at least one container further comprises executing the at least one application within the at least one container to process at least a portion of the IoT device sensor data.

11. The method as recited in claim 8, wherein processing at least a portion of the IoT device sensor data by the at least one container further comprises running at least one application within the at least one container to process at least a portion of the IoT device sensor data.

12. The method as recited in claim 11, wherein the IoT device sensor data is encrypted data that can only be decrypted by the at least one application running within the at least one container.

13. A system for processing Internet of Things (IoT) device sensor data, comprising:
   a computing platform; and
   at least one IoT device coupled to the computing platform, wherein the IoT device collects IoT device sensor data, wherein the IoT device transmits at least a portion of the IoT device sensor data to the computing platform, wherein the IoT device transmits at least one container image script to the computing platform, wherein the at least one container image script includes a pointer to a record relevant to process the IoT device sensor data, the at least one container image script includes parameters needed for operation of at least one container, wherein the computing platform loads into the computing platform the at least one container, based on the at least one container image script received by the computing platform, wherein the at least one container processes at least a portion of the IoT device sensor data within the at least one container to generate processed IoT device data;

wherein the computing platform transmits at least a portion of the processed IoT device data from the at least one container to the IoT device, and wherein the computing platform removes the at least one container from the computing platform in response to the computing platform transmitting at least a portion of the processed IoT device data from the at least one container to the IoT device.

14. The system as recited in claim 13, wherein the at least one container image script includes a pointer to a first container image stored in a repository, and wherein the computing platform loading the at least one container therein comprises the computing platform retrieving the first container image from the repository.

15. The system as recited in claim 14, wherein the first container image includes at least one application or at least one path to an application, and wherein processing at least a portion of the IoT device sensor data within the at least one container further comprises the at least one container executing at least one application therein to process at least a portion of the IoT device sensor data.

16. The system as recited in claim 13, wherein processing at least a portion of the IoT device sensor data within the at least one container further comprises running at least one application within the at least one container to process at least a portion of the IoT device sensor data.

17. The system as recited in claim 16, wherein the IoT device sensor data is encrypted data that can only be decrypted by the at least one application running within the at least one container.

* * * * *